United States Patent [19]

Donner

[11] 4,114,024
[45] Sep. 12, 1978

[54] FEEDBACK-CONTROLLED RADIANT FURNACE FOR FIRING CERAMIC MATERIAL AND THE LIKE

[75] Inventor: Joseph E. Donner, Pomona, Calif.

[73] Assignee: Unitek Corporation, Monrovia, Calif.

[21] Appl. No.: 602,208

[22] Filed: Aug. 6, 1975

[51] Int. Cl.² ............................................. H05B 1/02
[52] U.S. Cl. ........................................ 219/489; 13/12;
219/494; 219/501; 236/15 BG
[58] Field of Search ................ 219/489, 492, 494, 501;
13/12; 322/2 R; 323/75 H; 236/15 BG, 46 R,
46 C, 46 D

[56] References Cited

U.S. PATENT DOCUMENTS

| 3,301,482 | 1/1967 | Bullen | 236/46 R |
|---|---|---|---|
| 3,650,154 | 3/1972 | Arnett et al. | 323/75 H X |
| 3,786,161 | 1/1974 | Sartorius | 236/15 BG X |
| 3,901,437 | 8/1975 | Harkins | 219/492 X |
| 3,937,921 | 2/1976 | Furuichi et al. | 219/501 X |

Primary Examiner—Robert J. Hickey
Attorney, Agent, or Firm—Christie, Parker & Hale

[57] ABSTRACT

A radiant furnace for firing ceramic material provides for accurate control over the rate of increase of the ceramic material temperature during a firing operation. Heat is radiated in the furnace from an electrically controlled heater. A first programming signal is produced to represent a manually selected rate at which the temperature is to be raised, and a second programming signal is produced to represent a manually selected target temperature beyond which the ceramic material temperature is not to be raised. Circuitry responsive to the first and second programming signals produces a command signal varying in magnitude to define a ramp having a peak value. The command signal is applied to a closed-loop heating control subsystem employing a thermo-sensitive transducer for providing a feedback signal.

8 Claims, 6 Drawing Figures

FEEDBACK-CONTROLLED RADIANT FURNACE FOR FIRING CERAMIC MATERIAL AND THE LIKE

BACKGROUND OF THE INVENTION

In general, this invention relates to radiant furnaces of the type used for firing ceramic material such as artificial teeth and the like. More particularly, it relates to a radiant furnace having an improved heating control system.

Electric furnaces have long been used in the dental industry in connection with the manufacture of artificial teeth. The manufacturing process typically includes an initial step of making an impression of a patient's mouth. Then a plaster model is made and tested for proper fit and other purposes. A selection is then made of the most appropriate ceramic material (or material) from which the artificial tooth will be made so that it will closely resemble the patient's natural teeth. The selected ceramic material is then crafted to conform to the required size and shape. Finally, the crafted ceramic material is dried, fired, and glazed.

A radiant furnace is used for firing and glazing the crafted ceramic material, and can be used for the preliminary drying as well. To this end, the interior of the radiant furnace has one region that is not directly exposed to the radiant heat and that is occupied by the crafted ceramic material during the preliminary drying; and another region, directly exposed to the radiant heat, where the ceramic material is fired and glazed. Preferably, an automatic carriage mechanism is provided for transporting the crafted ceramic material from the drying region to the firing region.

The firing step of the process occurs while the ceramic material is in the firing region. Typically, the ceramic material is heated until its temperature is brought up to or about a target temperature, and then the ceramic material is subjected to an air quench to cool it. Sometimes, an additional stage of operation is involved whereby the ceramic material is maintained at or about the target temperature for a preselected interval of time before it is cooled. In any case, it is desirable to provide a static type of temperature control to cause heating to stop when the ceramic material temperature is brought up to a temperature falling within a target temperature range. Prior art radiant furnaces have proven suitable with respect to providing such static temperature control. Experience has shown that consistent results require a dynamic type of temperature control. That is, it is important to provide accurate control over the rate of increase of the ceramic material temperature. Heretofore, heating systems in radiant furnaces have proven unsatisfactory with respect to ensuring that the rate of increase of temperature falls within acceptable limits. Undesirable variations in this rate of increase usually result from variations in the electric power supplied to the furnace. It is common for the line voltage in a given location to vary from as low as 100V rms to as high as 120V rms during a single day. Moreover, where the voltage applied to an electric heating element varies, the heating energy produced varies as a function of the square of the variations in applied voltage.

SUMMARY OF THE INVENTION

This invention is directed to a heating system in a radiant furnace for firing ceramic material such as artificial teeth and the like. The heating system comprises electrically controllable heating means such as an electric heating coil for radiating heat in the furnace. First manually settable means produce a first programming signal representative of a selected rate at which the temperature of the ceramic material is to be increased during a firing operation. Preferably, the first manually settable means includes a potentiometer that is manually adjustable by rotating a control knob on a front control and display panel of the radiant furnace. This adjustability feature enables the selection of the appropriate rate for the particular ceramic material being fired. Second manually settable means produce a second programming signal representative of a selected target temperature beyond which the ceramic material temperature is not to be raised. Preferably, the second manually settable means includes a potentiometer that is manually adjustable by rotating a control knob on the front panel of the radiant furnace. This adjustability feature enables the selection of the appropriate programmed target temperature for the particular ceramic material being fired.

First circuit means produce a command signal varying in magnitude to define a ramp having a peak magnitude. The first circuit means includes means responsive to the first programming signal for controlling the slope of the ramp, and includes means responsive to the second programming signal for controlling the peak magnitude of the ramp. Preferably, the first circuit means includes a capacitor and circuitry operable to supply for an interval of time substantially constant current to it so that the voltage developed across the capacitor increases in a generally linear manner until it reaches a peak value.

Transducer means respond to the heat radiated from the heating means produce a feedback signal. Preferably, the transducer means comprises a thermo-couple having one portion positioned to be responsive to the heat radiated in the firing region in the furnace, and another portion positioned to be responsive to the room temperature. In the preferred embodiment, a temperature compensation network is provided for reducing the influence of room temperature variations on the feedback signal.

Second circuit means define a summing junction for algebraically summing the command signal and the feedback signal to produce an error signal, and third circuit means respond to the error signal to control the heating means.

A key advantage arising from the heating system of this invention resides in the accuracy with which the rate of temperature rise can be controlled. In particular, the disturbing effects of factors such as line voltage variations are minimized, and, accordingly, more consistent firing results are achievable.

DETAILED DESCRIPTION

Figures 1, 2:
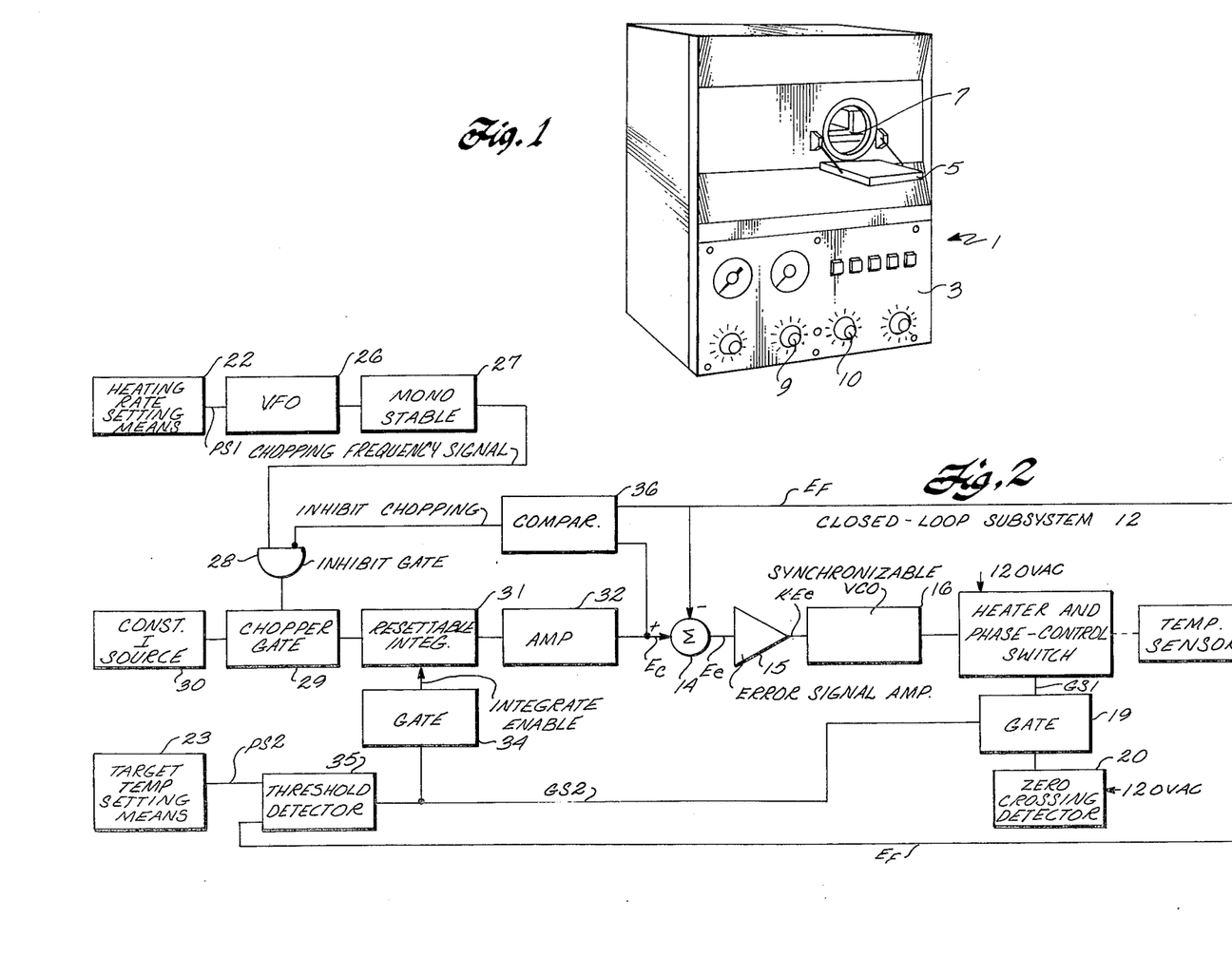
FIG. 1 is a perspective view of a radiant furnace which contains the heating system of this invention, and shows particularly a front control and display panel of the furnace.
FIG. 2 is a general block diagram depicting the general arrangement of the elements of the preferred embodiment of the heating system of this invention.

With reference to FIG. 1, a radiant furnace 1 has a front control and display panel 3. Above the panel 3 there is a door 5 shown open to expose a drying region of the interior of the furnace. As is conventional, a firing tray 7 is provided for carrying ceramic material from the drying region to a heating region of the interior of the furnace.

The furnace includes a number of subsystems that may be conventionally arranged and are not directly interrelated with the heating system of this invention. One such subsystem is an evacuation subsystem including control circuitry embodied therein and for evacuating the interior of the furnace during the firing and glazing of the ceramic material. Another such subsystem provides for automatically transporting the firing tray back and forth between the firing region and the drying region. Some of the indicators and manual controls of the panel 3 relate to such subsystems and accordingly are not described in detail herein.

As to the manual controls that are pertinent to the heating system, reference is made to control knobs 9 and 10 which form elements of manually settable means for producing programming signals used in the heating system. One of these programming signals represents a selected is to be increased during a firing operation. The other programming signal represents a selected target temperature beyond which the temperature of the ceramic material is not to be increased substantially.

With reference to FIG. 2, there will now be described the general organization of the heating system. A closed-loop subsystem indicated generally at 12 defines a summing junction 14 for algebraically summing a command signal $E_c$ and a feedback signal $E_F$. The output of the summing junction is an error signal $E_e$ that is amplified by an error signal amplifier 15 in the feed-forward path of the closed-loop subsystem. The amplified error signal, identified as $K.E_e$, is applied to a synchronizable VCO (voltage controlled oscillator) that forms an element of circuit means for controlling the furnace heater. In the preferred embodiment, an electric heating coil 17 (FIG. 6) serves as the furnace heater.

The heating coil dissipates a considerable amount of power in order to raise the ceramic material temperature to the typical target temperature ranges which are in the neighborhood of 960° C. In the preferred embodiment, the heating coil can dissipate in excess of 1000 watts. In view of the large amount of power that must be controllably supplied to the heating coil, it is preferable to employ phase-control techniques in controlling the application of line voltage (120V ac) to the heating coil.

Figure 6:
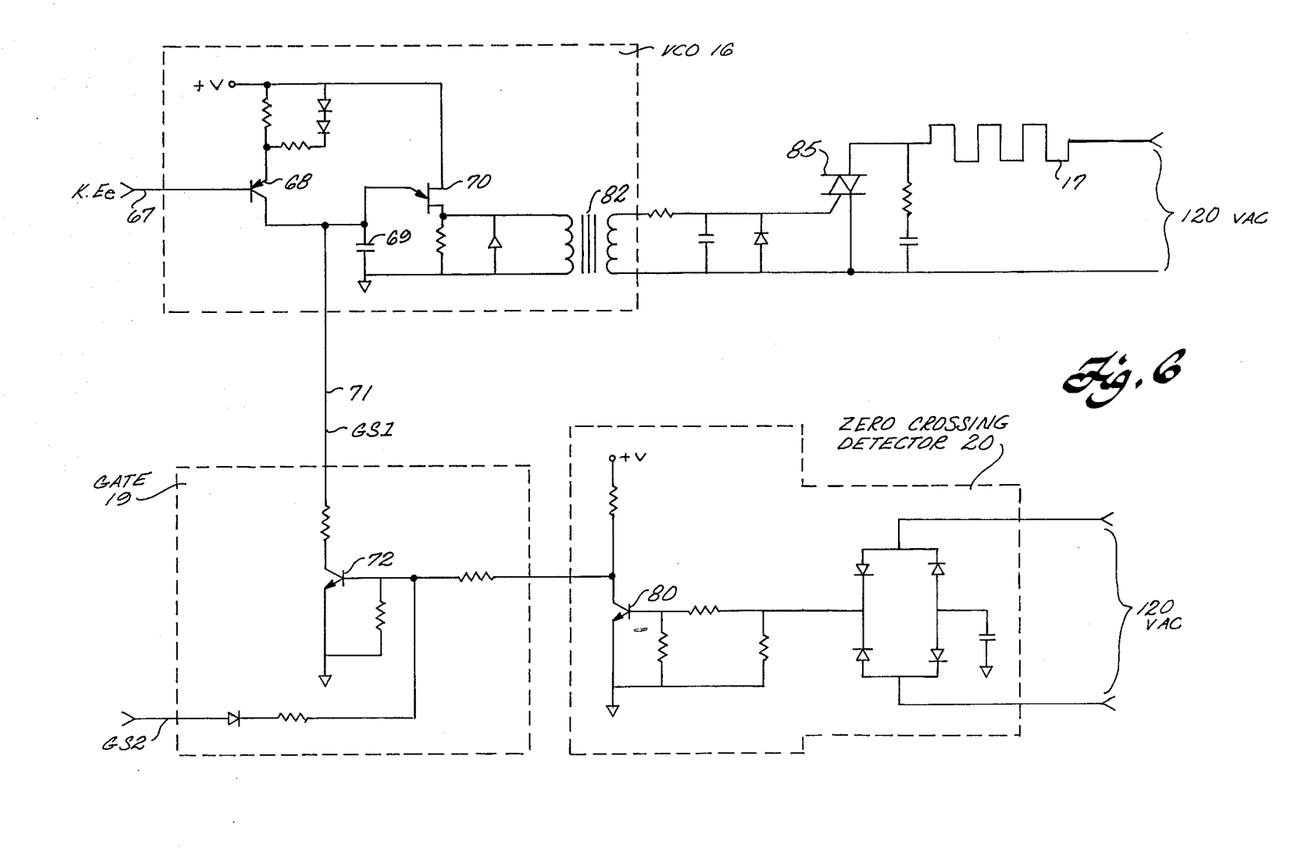
FIG. 6 is a schematic diagram depicting the details of the preferred arrangement of elements forming a feed-forward path in the closed loop subsystem of FIG. 1.

To achieve this phase-control, the feed-forward path includes a latching switch such as a triac 85 (FIG. 6).

The latching switch is turned on by a trigger signal provided by the VCO 16, and, while on, connects the line voltage across the heating coil. The latching switch automatically resets (i.e., turns off) at the time when current flowing through it drops to zero incident to the polarity reversal of the line voltage on each one-half cycle. The amount of electrical power applied to the heating coil is proportional to the phase difference between a point at which the latching switch turns on and a point at which it turns off. In other words, by triggering the latching switch earlier in a given half-cycle, more power is supplied, and by triggering it later, less power is supplied.

In the preferred embodiment, the VCO 16 is synchronized to the 60 hertz line voltage in response to a gating control signal GS 1 supplied to it by a gate 19. As will be described more fully below, the closed-loop subsystem 12 of the preferred embodiment has a first mode of operation involved in dynamic-type temperature control (i.e., while the ceramic material temperature is being raised), and a second, somewhat different, mode of operation involved in static-type temperature control (as when the ceramic material temperature is being stabilized for an interval of time within the target temperature range). In particular, while the temperature is being stabilized, the closed-loop subsystem exhibits a hysteresis characteristic such that heating occurs to raise the temperature to an upper limit and then ceases until the temperature drops to a lower limit, these limits defining what is referred to herein as a "stabilization temperature range". During intervals in which the temperature is dropping from the upper limit to the lower limit, the gating control signal GS 1 defines a continuous disabling level causing the VCO 16 to cease oscillation so that it does not trigger the latching switch. During intervals in which heat is being generated, the gating control signal GS 1 defines sync pulses for synchronizing the oscillation of the VCO 16 to the 60 hertz frequency of the line voltage. To this end, the gate 19 has one input for receiving pulses from a zero crossing detector 20 that detects the polarity reversals of the line voltage. Another input of the gate 19 receives a gating control signal GS 2 which is a binary-valued signal. While the gating control signal GS 2 is defining the first of its binary values, the gate 19 provides sync pulses; otherwise, the gate 19 provides the continuous disabling level.

The elements of the heating system involved in the generation of the command signal will now be described. As shown in FIG. 2, heating rate setting means 22 and target temperature setting means 23 are provided for producing two programming signals PS1 and PS 2. Preferably, the heating rate setting means 22 includes a potentiometer 24 (FIG. 3) that is manually adjustable by rotating the control knob 9 (FIG. 1) on the panel 3. The signal PS 1 is an analog signal having a scale factor such that it represents a manually selected rate at which the temperature of the ceramic material is to be increased during a firing operation. Preferably, the target temperature setting means 23 includes a potentiometer 25 (FIG. 4) that is manually adjustable by rotating the control knob 10 (FIG. 1) on the panel 3. The signal PS 2 is an anlog signal having a scale factor such that it represents a manually selected target temperature for the particular ceramic material being fired.

In the preferred embodiment, a signal-controlled, variable frequency oscillator (VFO) 26 is provided to serve as an element of means for controlling the slope of a ramp defined by the command signal $E_c$. The VFO 26 operates at a frequency that depends upon the value of the programming signal PS 1. A monostable circuit 27 responds to the output of the VFO 26 to provide a chopping frequency signal that is selectively coupled through an inhibition gate 28 to a chopper gate 29.

The chopper gate 29 is connected in tandem between a constant current source 30 and a resettable integrator 31. The output of the resettable integrator 31 is buffered by an amplifier 32 to produce the command signal. Preferably, the resettable integrator includes a capacitor 33 (FIG. 4) that receives charging current in a controlled manner described in detail hereinafter. The resettable integrator has a control input for receiving an integrate enable signal from a gate 34.

The gate 34 and a target temperature threshold detector 35 serve as elements of the preferred arrangement of means responsive to the programming signal PS 2 for controlling the peak magnitude of the ramp defined by the command signal. The detector 35 has two inputs for receiving the signals PS 2 and $E_F$, and provides at its output the a binary-valued gating control signal GS2 that is applied to the gate 34 and also to the gate 19. The feedback signal is an analog signal having a scale factor such that in operation it represents the temperature of the ceramic material being fired. When the ceramic material termperature reaches an upper limit, the output of the detector 35 has a binary value which causes the gate 34 to reset the integrator 31. At the same time, the gate 19 responds by causing the gating control signal GS 1 to have the continuous disabling level, and thus generation of further heating is interrupted.

As a result of this temporary interruption, the temperature of the ceramic material will drop toward the lower limit of the stabilization temperature hysteresis characteristic. When this lower limit is reached, the output of the detector 35 switches in binary value to enable the resettable integrator to integrate again, and to enable the synchronizable VCO 16. At this point in the operation of the preferred arrangement, the command signal is rapidly slewed from the value it had as a result of the resetting of the resettable integrator 31 back to its selected peak value. To this end, a comparator 36 is provided in the preferred arrangement. The comparator 36 has two inputs for receiving the signals $E_c$ and $E_F$, and provides at its output a binary-valued signal that is applied to the inhibition gate 28. During this rapid slewing mode of operation, the chopper gate 29 is disabled, and the output of the constant current source 30 is continuously supplied to the capacitor 33 in the resettable integrator 31 to cause rapid charging thereof.

Figure 3:
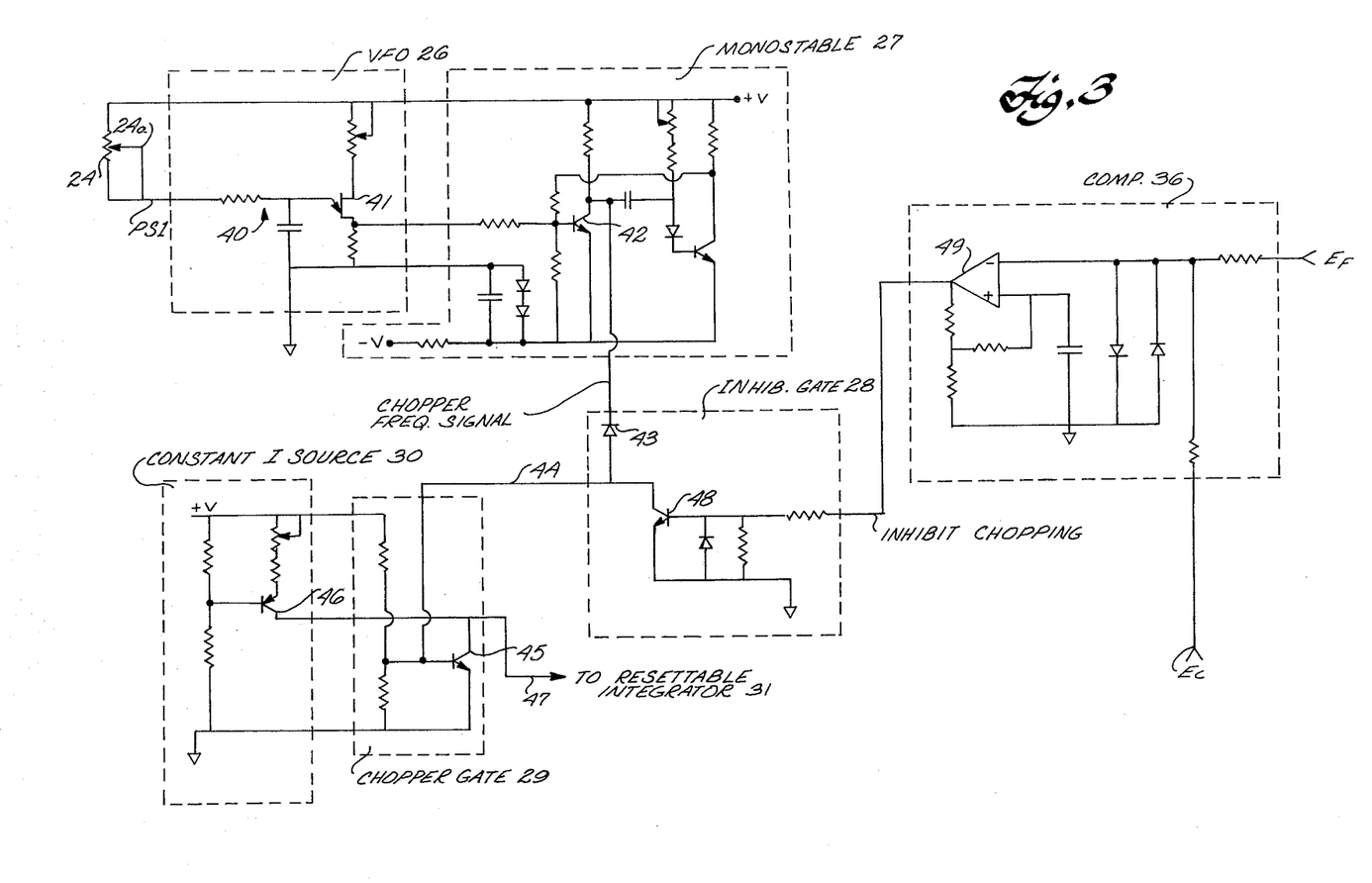
FIG. 3 is a block and schematic diagram depicting the details of the preferred arrangement of elements of the system involved in controlling the slope of a ramp-defining command signal in response to a rate programming signal.

With reference to FIG. 3, there will now be described the details of the circuitry used in the preferred embodiment to perform the functions involved in controlling the slope of the ramp defined by the command signal.

Potentiometer 24 is serially connected with an R-C network 40 to form the frequency determining portion of a unijunction transistor oscillator. D.C. operating power (+V and −V) for this and other circuits described hereinafter is preferably provided by conventional voltage regulators (not shown) that convert the 60 cycle line voltage to stable D.C. voltages. By manually adjusting the wiper arm 24a of the potentiometer 24, the time constant of the R-C network can be increased or decreased and thereby control how long it takes for a unijunction transistor 41 to turn on. Each time the unijunction transistor 41 turns on, a pulse is supplied to a normally off transistor 42 in the monostable circuit 27.

The voltage at the collector of the transistor 42 defines time-spaced-apart, negative-going pulses. Each such pulse has the same width, with the R-C time constant of the monostable circuit determining this width. The pulse repetition frequency (PRF), however, varies in direct proportion to the oscillation frequency of the VFO 26.

This pulse train of negative-going pulses serves as the chopper frequency signal described above. The inhibition gate 28 includes a diode that selectively couples via a signal lead 44 the chopper frequency signal to the base electrode of a transistor 45 in the chopper gate 29. The transistor 44 is biased so that when a low level is not applied to the signal lead 44, the transistor 45 is on.

The constant current source 30 includes a transistor 46 that is biased to provide a substantially constant collector current. When the transistor 45 in the chopper gate 29 is on, it acts as a current sink for all the collector current of the transistor 46. When the transistor 45 is held off, this collector current flows out on a signal lead 47 that is connected to the signal input of the resettable integrator 31 shown in more detail in FIG. 4. With this arrangement, current pulses flow through the capacitor 33 (FIG. 4) causing the voltage thereacross to increase steadily at an average rate that varies in accordance with the PRF of the chopper frequency signal.

As stated above, a fast-slewing mode of operation is provided to restore the command signal to its selected peak value. During this mode of operation, the inhibition gate 28 inhibits the chopping of the output of the constant current source. In particular, a transistor 48 in the inhibition gate 28 is held on continuously so that a constant low level is appled to the signal lead 44 to hold the transistor 45 off. The operating condition of the transistor 48 is controlled by the output of an integrated circuit 49 in the comparator 36. This integrated circuit is responsive to the feedback and command signals $E_F$ and $E_c$. During the rapid slewing mode, the command signal magnitude relative to the feedback signal magnitude is sufficiently low that the integrated circuit 49 provides a high-level output to drive the transistor 48 on. Eventually, the rapid slewing brings the command signal magnitude back to its peak value and then the integrated circuit 49 switches, and provides a low-level output to turn transistor 48 off.

Figure 4:
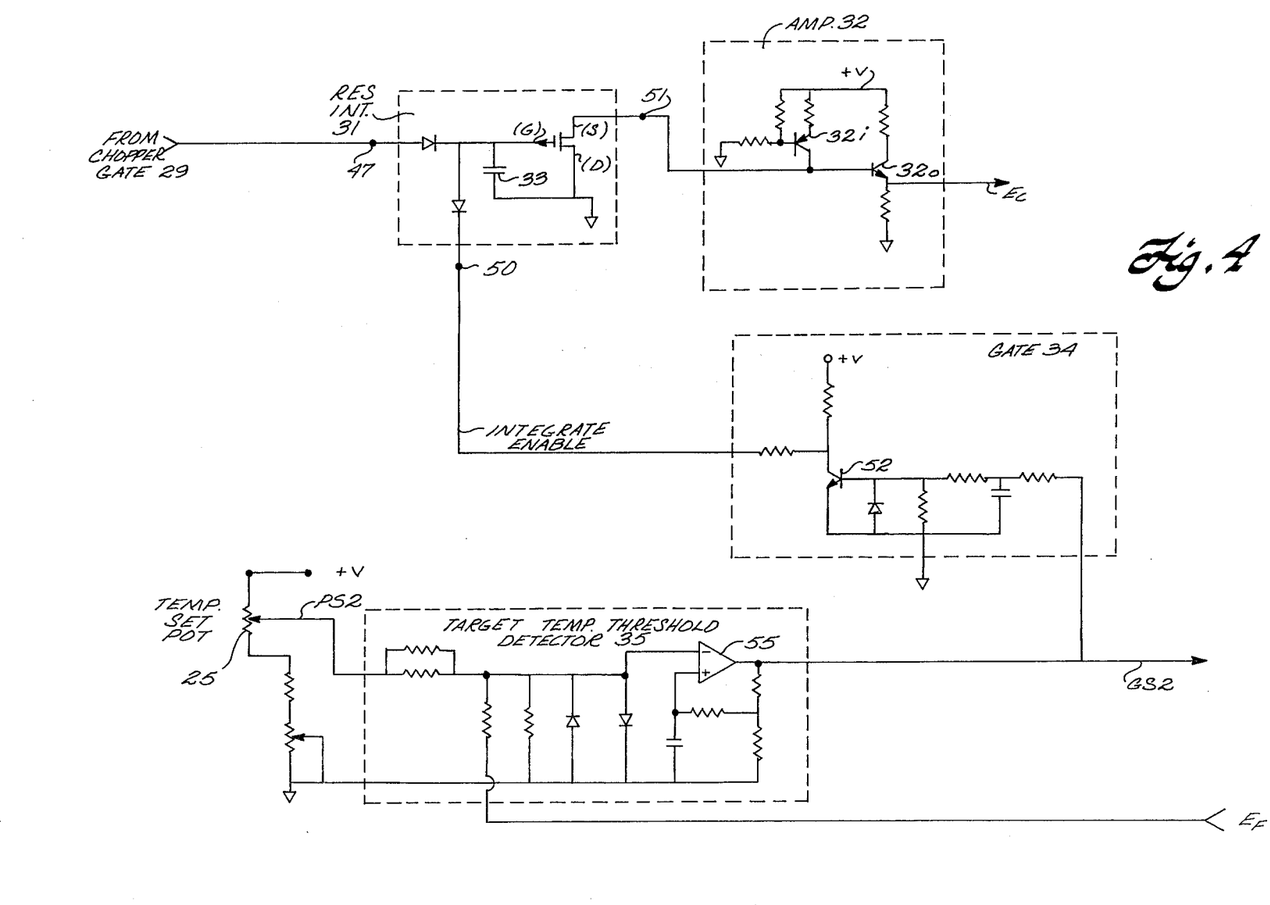
FIG. 4 is a block and schematic diagram depicting the details of the preferred arrangement of elements of the system involved in generating the command signal and in controlling its peak value in response to a target-temperature programming signal.

With reference to FIG. 4, there will now be described the details of the circuitry used in the preferred embodiment to perform the functions involved in generating the command signal and controlling its peak value in accordance with the programming signal PS 2.

The resettable integrator 31 has a signal input connected to the signal lead 47, a control input connected to a signal lead 50, and an output connected to a signal lead 51. The amplifier 32 has its input connected to the signal lead 51 to respond to an FET buffer stage of the integrator 31. The FET used in the preferred embodiment is identified as a 2N4352. When this FET operates with relatively low and relatively constant drain current (about 0.5ma), its gate-source voltage remains substantially constant (at about 2 volts). The FET has its source (S) connected to signal lead 51, and the capacitor 33 is connected in parallel between the gate and the drain. The input-stage transistor 32i in the amplifier 32 provides substantially constant current to flow through the drain. Thus, the voltage developed between source and drain equals the sum of a constant voltage of about 2 volts and the varying voltage across the capacitor 33. The output stage transistor 32o of the amplifier 32 is connected in an emitter-follower configuration to buffer the FET output voltage.

The signal lead 50 carries the integrate enable signal which is produced by the gate 34. A transistor 52 in the gate 34 is turned on when the gating control signal GS 2 is at a high level. With the transistor 52 being on, it acts as a current sink whereby the current from the constant current source 30 (FIG. 3) flows through it rather than into the capacitor 33. When the gating control signal GS 1 is at the low level, the transistor 52 is turned off and therefore the capacitor 33 receives charging current.

The gating control signal GS 2 is produced by the target temperature threshold detector 35 in response to the programming signal PS 2 and feedback signal $E_F$. During the time in which the ceramic material temperature is being raised toward the upper limit of the stabilization temperature range, the programming signal PS 2 magnitude relative to the feedback signal $E_F$ magnitude is such that an integrated circuit 55 in the detector 35 provides a low-level output.

It will be appreciated from what has so far been described that in the operation of the preferred embodiment, the command signal varies in magnitude to define a ramp having a peak value during the time that the ceramic material temperature is being raised. In typical practice, prior to the time that the dried ceramic material is transported into the firing region, the target-temperature setting potentiometer 25 is set to program the heating system for a starting temperature in the neighborhood of 800° C. After the ceramic material is transported into the firing zone, it is desirable to raise the ceramic material temperature at a uniform rate to a temperature in the neighborhood of 960°. For a typical porcelain material used in the dental industry, it is desirable for the rate to be in the neighborhood of 32° C. per minute. Thus, in typical practice, it will take about 5 minutes for the ramp defined by the command signal to reach its peak value.

One of the advantages of the chopping technique employed in this specific embodiment is that it is practical to use relatively high current levels in connection with the charging of the capacitor 33. A suitable alternative to this chopping technique is to arrange a capacitor in the feedback path of an operational amplifier that exhibits low offset current drift.

In further summary of the operation involved in generating the command signal, this specific embodiment causes, owing to the operation of the detector 25 and the gate 34, the command signal to return to zero at the stage when the feedback signal indicates that the upper limit of the stabilization temperature range has been reached. After a temporary interruption of heating, the ceramic material will have cooled somewhat (e.g., about 20° C.) to the lower limit of the stabilization temperature range. At this point, the operation of the detector 35 and the gate 34 enables the integrator 31 again, and the comparator 36 enables the fast slewing mode of operation whereby the command signal increases with a steep slope until the comparator 36 disables the fast slewing incident to the command signal magnitude exceeding the feedback signal magnitude. Then the command signal continues to increase further until it reaches the peak value with a slope proportional to the heating rate setting.

Figure 5:
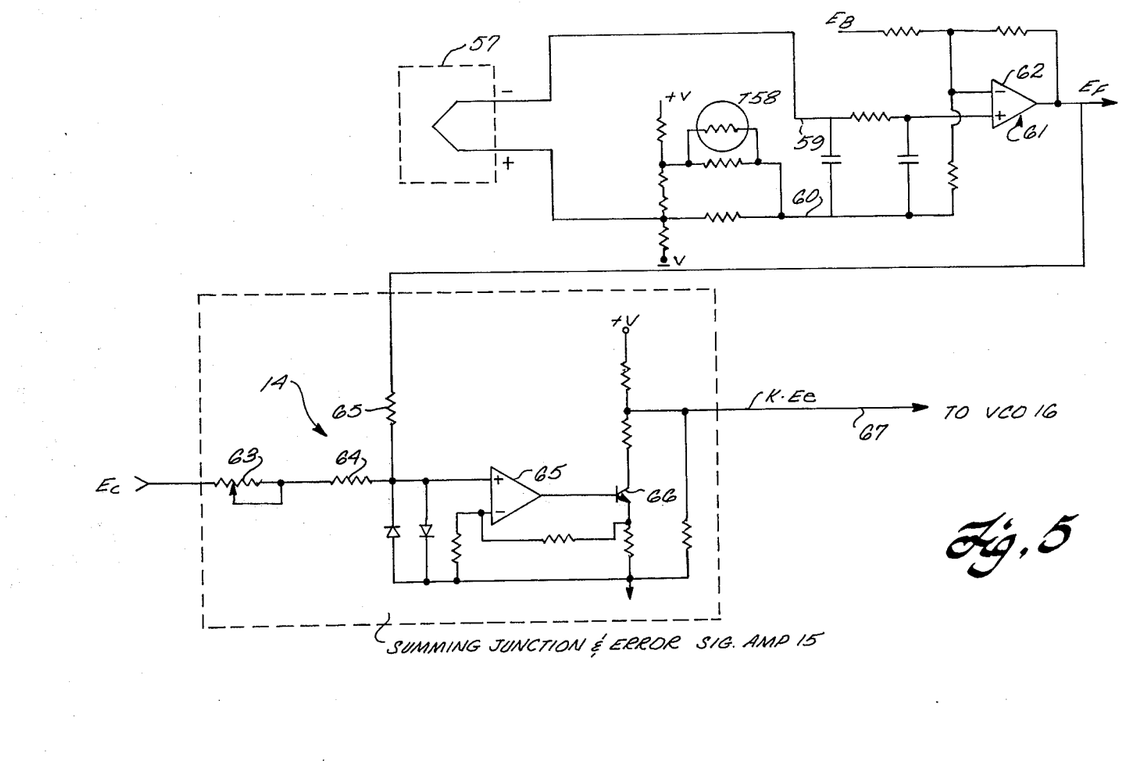
FIG. 5 is a block and schematic diagram depicting the details of the preferred arrangement of the transducer means and error signal amplifier of FIG. 1.

With reference to FIG. 5, there will now be described the details of the preferred arrangement of the elements of the system involved in producing the feedback signal and error signal.

In the preferred embodiment, a thermocouple 57 is provided with one portion thereof being disposed in the firing region so as to be directly exposed to the heat radiated from the heating coil. Another portion of the thermocouple is disposed so as to be responsive to the room temperature outside the furnace. To compensate for variations in room temperature, a compensation network including a thermistor T 58 is provided so that the voltage developed between the signal leads 59 and 60 accurately represents the temperature of material exposed to the radiated heat in the furnace. A high gain amplifier 61 including an integrated circuit operational amplifier 62 amplifies the compensated signal to produce the signal $E_F$. A biasing voltage level $E_B$ is summed into the operational amplifier so that the signal varies relative to a positive reference level.

In the preferred embodiment, a resistor summing network comprising resistors 63, 64, and 65 forms the summing junction of the closed loop subsystem. The error signal amplifier 15 includes an operational amplifier 75 and buffer stage transistor 66. The $K.E_r$ output of the amplifier 15 is carried by a signal lead 67 to the VCO 16 (FIG. 6).

With reference to FIG. 6, there will now be described the details of the preferred arrangement of the elements of the system involved in controlling the application of power to the heating coil in response to the error signal.

The synchronizable VCO 16 includes a transistor 68 that is arranged to provide a constant collector current in an amount proportional to the magnitude of the amplified error signal $K.E_r$. A capacitor 69, which forms part of a unijunction transistor oscillator, is connected to receive the current output of the transistor 68. When current flows into the capacitor 69, the voltage thereacross builds up until it reaches the threshold level of a unijunction transistor 70. At this point, the unijunction transistor turns on and its low input impedance substantially discharges the capacitor 69. The above-described portion of this circuitry forms a free-running oscillator. It has been found desirable to synchronize the VCO 16 to the 60 hertz line frequency. To this end, the VCO 16 preferably has a control input connected to a signal lead 71.

The gate 19 has its output connected to the signal lead 71. A transistor 72 in the gate 19, when switched on, acts as a sink for the collector current for the transistor 68. When the transistor 72 is held on continuously, the capacitor does not charge up to the threshold level, and thus the VCO ceases oscillating. This occurs during the temperature stabilization mode while the temperature is allowed to decrease from the upper limit to the lower limit. Apart from this mode of operation, the transistor 72 is turned on and off at a 120 hertz rate to provide for synchronizing the VCO. As to the duty cycle involved in this synchronization, the transistor 72 is turned on very briefly during the first few degrees surrounding each zero crossing of the line voltage, and is turned off for the balance or major portion of each half-cycle.

The zero crossing detector 20 provides pulses to the gate 19 at a prf of twice the 60 hertz line frequency. The detector 20 includes a full-wave rectifier arrangement of diodes which rectify the 120V ac line voltage, and drive the transistor 80. The transistor 80 operates in saturation throughout the major portion of each one-half cycle; it is turned off only during the brief interval surrounding the zero crossings while the output of the full-wave rectifier is less than the base-emitter threshold emitter voltage of the transistor 80.

As a result of the aboved-described synchronizing arrangement, the capacitor 69 commences charging at the same phase angle on each one-half cycle of the 60 cycle line voltage. The time interval occurring between the point of commencement of this charging and the point of triggering the unijunction transistor 70 depends on how much current is delivered by the transistor 68. This in turn depends on the amplified error signal.

Each time the unijunction transistor 70 turns on, a pulse is coupled through a transformer 82 to the gate of a triac 85. Each such pulse triggers the triac into conduction, and it latches on until the current flowing through it drops to zero. While on, the triac 85 connects the line voltage across the heating coil 17. The amount of electrical power applied to the heating coil is proportional to the phase difference between the point at which the triac turns on and the point at which it turns off. It will be appreciated that the VCO 16 responds to the magnitude of the amplified error signal to control the phase angle at which the triac is turned on.

It will be appreciated from the foregoing description that disturbance influences such as variations in the magnitude of the line voltage and variations in the heating coil resistance have less adverse effect on the heating of the ceramic material than that which occurs with prior art heating systems. For example, any tendency toward an undue increase in heating incident to an increase in line voltage magnitude is counteracted in the following way. The temperature increase is sensed by the thermocouple with the result that the feedback signal is increased in magnitude. This in turn reduces the difference between the command signal and the feedback signal, and, accordingly, the error signal is smaller in magnitude. In response to the smaller error signal, the sychronizable VCO has a lower frequency of operation. Thus, the trigger signal to the triac is delayed longer in time and the larger-magnitude line voltage is connected across the heating coil for a reduced portion of the cycle. The net result is that approximately the same amount of heating energy is produced notwithstanding the variation in line voltage.

I claim:

1. In a radiant furnace for firing ceramic material such as artificial teeth and the like, a precision heating system to provide for controlling the temperature of the ceramic material being fired, the heating system comprising:

a source of unregulated line supply voltage;

electrically controllable heating means for radiating heat in the furnace connected to the line supply voltage;

first manually settable means for producing a first programming signal representative of a selected rate at which the temperature of the ceramic material is to be increased during a firing operation;

second manually settable means for producing a second programming signal representative of a selected target temperature beyond which the temperature of the ceramic material is not to be raised;

first circuit means having a first mode of operation for producing a command signal varying in magnitude to define a ramp having a peak magnitude and produce a steady rise in ceramic material temperature and a second mode of operation for producing a substantially stable ceramic material temperature, the first circuit means including means responsive to the first programming signal for controlling the slope of the ramp, means responsive to the second programming signal for controlling the peak magnitude of the ramp and a comparator;

transducer means responsive to the heat radiated from the heating means for producing a feedback signal; said comparator being responsive to the second programming signal and feedback signal for producing a signal to control the mode of operation of the first circuit means;

second circuit means defining a summing junction for algebraically summing the command signal and the feedback signal continuously during system operation to produce an error signal; and third circuit means responsive to the error signal for continuously controlling the heating means.

2. The heating system of claim 1 wherein the heating means comprises a heating coil, and wherein the third circuit means includes switching means for connecting a continuously variable phase-controlled portion of an alternating voltage waveform across the heating coil.

3. The heating system of claim 2 wherein the switching means comprises a triac.

4. The heating system of claim 1 wherein the transducer means comprises a thermocouple having one portion exposed to the heat radiated from the heating means and another portion exposed to room temperature.

5. The heating system of claim 4 wherein the transducer means includes an amplifier the output of which supplies the feedback signal, the amplifier having its input connected to the thermocouple, and includes a compensation network coupled to the amplifier input to provide for temperature compensation of room temperature variations.

6. The heating system of claim 1 wherein each manually settable means includes a respective potentiometer.

7. The heating system of claim 1 wherein the first circuit means includes a capacitor and means for supplying the current to flow through the capacitor so that a ramp-defining voltage is developed thereacross.

8. The system of claim 1 and further comprising gating means responsive to the gating control signal for disabling the third circuit means so as to provide an interruption in heating.

* * * * *